Feb. 28, 1933.                J. GROSS                1,899,146
              GLASS BAR AND METHOD OF MAKING SAME
                     Filed July 11, 1927
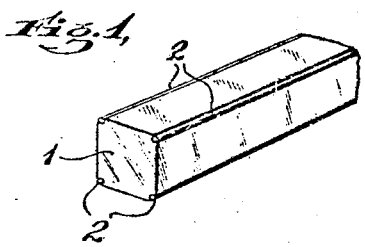
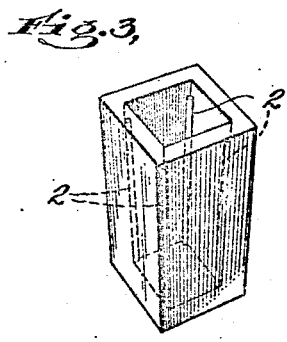
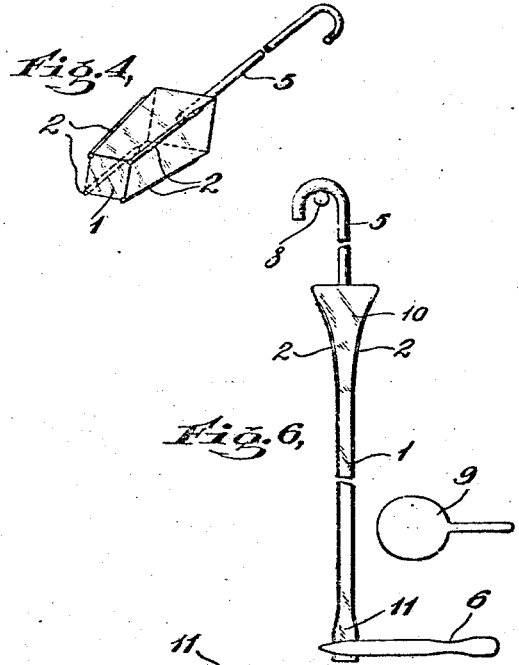
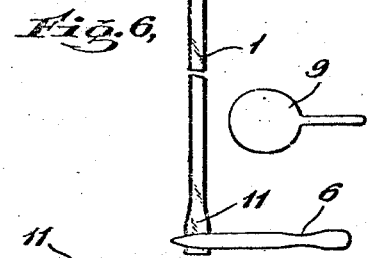
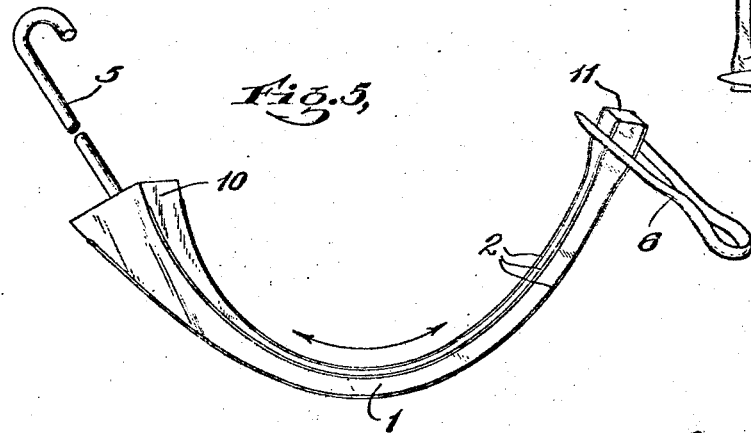
INVENTOR
ATTORNEY Patented Feb. 28, 1933

1,899,146

UNITED STATES PATENT OFFICE

JAMES GROSS, OF BROOKLYN, NEW YORK

GLASS BAR AND METHOD OF MAKING SAME

Application filed July 11, 1927. Serial No. 204,719.

My invention relates to bars, hollow or solid, of glass and the like, of square and other cross sections which present more or less of an edge or edges at the surface of and longitudinal to the bar.

One object of my invention is to provide a method for making such bars in larger sizes than it has been possible to draw heretofore.

Another object is to provide such bars with different colors at their surfaces, and especially at their edges.

The invention relates especially to the production of glassware for bathroom fixtures, but it is not so limited as will become apparent.

Round glass bars of various sizes are commonly produced by a drawing process. One end of an iron rod (called the "iron" or "gathering iron") is dipped repeatedly into molten glass and between dippings the collected mass is rolled on an iron plate or "marver" until a truncated cone of hot plastic glass of sufficient size is secured on the iron. The iron extends a short distance into the larger end of the truncated cone. Finally the mass may be reheated to secure the desired degree of softness and then the plate portion of a hot "punty" (an iron rod having a perforated circular iron plate on one end perpendicular to the axis of the rod) is pressed against the smaller end of the glass cone and stuck fast to it. A man with the punty and another with the iron then walk away from each other, pulling the conical mass out into a round bar a number of feet in length. Both men watch the glass as it draws out, turning and twisting the iron and punty, and occasionally winding back some of the drawing glass onto the tools (especially onto the punty), to make the glass draw as uniformly as possible, without thin spots, and to keep the glass from being broken away from the tools. Attendants walk back and forth along the drawing bar with fans in their hands, fanning spots that show a tendency to draw dangerously thin, thus locally cooling and hardening the glass to temporarily retard the drawing at those spots. When finished, the glass bar is laid down on the floor and cut into the desired shorter lengths. It will be observed that the bar is drawn in a generally horizontal direction, and its weight causes it to sag into a very perceptible curve.

Tubes can be made in the same manner, the mass of glass being pierced longitudinally before the drawing is started. Also the drawing glass tends to keep the same cross-sectional shape as the original glass mass, so bars corrugated lengthwise can be made in the same manner by corrugating the mass on the iron before starting the drawing; thermometer tubing also, which is more or less egg-shape in cross section, has been drawn in this manner from a mass egg-shape in cross section. I believe square bars can also be made by the same method. However, while round bars of substantially any size can be made in this way, these other shapes, that is to say shapes having more or less of an edge or edges lengthwise of the bar, can be made practically only in small sizes by this method of horizontal drawing, say up to about one-fourth inch in cross dimension. If the initial mass of glass is large enough to make a bar of larger transverse size and sufficient length to warrant the operation, the edges break and separate into a number of pieces before the mass can be drawn down to the desired size. I believe that this is due to the bending and bending stresses which this horizontal method of drawing imposes on the drawing bar. It is obvious that the protruding edges must cool more rapidly than the rest of drawing bar during the drawing operation. Accordingly they become harder and less viscous than the remainder. I believe therefore that the edges of the bar break under the bending stresses caused by the sagging of the bar during the drawing operation; the glass at the interior of the bar and at the flat or more gently curved sides of the bar being comparatively softer and hence yielding more readily to the stresses, an unduly large part of the strain is thrown on the comparatively-unyielding glass at the edges and these break.

Be this theory correct or not, I have found that edged bars, that is to say, square bars and bars of other shapes having more or less of a lengthwise edge or edges, can be drawn in substantially any size that can be handled, if drawn in accordance with my method as herein described.

According to my invention the final mass of glass (it may be on the end of an iron as before) is molded to the cross-sectional shape desired and smaller at one end than at the other, then reheated if necessary to secure the desired degree of plasticity, and then grasped and drawn, the latter part of the drawing being in a vertical direction and without any considerable bending. The first part of the drawing, while the whole mass is quite hot and plastic, is done more or less horizontally as heretofore, and can be done with considerable sag, and each end can be raised alternately higher than the other, and the bar bent at one place and another, to obtain the proper initial movement of the glass, as will be understood by those accustomed to drawing glass. The glass can be bent safely at this stage while the glass is still quite hot and soft throughout, and frequency shows a distinct tendency to flow as distinguished from a simple uniform extending or stretching out in the manner of elastic and tenacious plastic materials. When the glass has cooled to the point where it tends to extend uniformly however, I discontinue this operation and finish with drawing in a substantially vertical direction until the desired size is reached. As before the glass can be fanned at spots that tend to thin too rapidly or too much. In this manner I have made square bars measuring substanstantially one inch on each side and larger.

To stripe drawn bars with color, I apply glass "canes" of the desired colors to the outside of the glass mass just prior to the drawing. For square bars and the like, I may shape the initial mass by thrusting it down into a hot square mold, larger at the top than a the bottom and placed vertically. In the mold I stand the canes, i. e. relatively small glass bars, of the color to be applied, leaning them against the sides of the mold. On thrusting the glass mass on the iron into the mold, the heat of this (considerably larger) mass softens the colored canes sufficiently to attach them to the outside of the mass, and the reheating, if necessary, incorporates them into the mass so that on the subsequent drawing of the mass, the canes draw or extend along with the remainder of the mass and form an integral part of the finished bar. By standing the canes in the corners of a square mold, I am able, in this way, to obtain a square glass bar indelibly striped at its very corners.

The accompanying drawing illustrates my invention as I have employed it in drawing square bars striped at their corners. Fig. 1 is a perspective of the finished bar. Fig. 2 is a short length of cane. Fig. 3 is a perspective of the mold. Fig. 4 is a perspective of the mass of glass on the end of the iron as it comes out of the mold, and with the canes attached. Fig. 5 is illustrative of the first stage of the drawing. Fig. 6 is illustrative of the final drawing or drawing in the vertical direction.

It will be understood that the drawing I refer to is done entirely in the open, i. e. without enclosing the bar in a mold during the drawing operation.

The product or bar of Fig. 1, the making of which I shall now describe, is substantially square in cross-section, as will be observed. The body part 1 may be of opal glass, for example, and the stripes at the corners 2 are of a contrasting color, for example black.

To make such a bar according to my process, I repeatedly dip a "gathering iron" 5 into molten opal glass and between dippings roll the collected mass on an iron plate or marver to form a lump having the shape of a truncated cone, all as for making round glass bars. When a sufficient quantity has thus been collected and "marvered", I give it the desired shape in cross-section, preferably by thrusting it into the mold of Fig. 3. For square bars, this mold is square in cross section of course, and preferably is larger at the top than at the bottom to permit the molded mass to be withdrawn easily. By way of example, for making square bars, such as are shown in Fig. 1, measuring about one inch on each side, I use a mold measuring about 8½ inches in depth, 3½ inches on each side at the top, and 2½ inches on each side at the bottom. The mold is closed at the bottom and stands upright. The glass canes of contrasting color, to provide the stripes 2 of the finished bar, are stood in the four corners of the mold as appears in Fig. 3. For a mold about 8½ inches deep, I usually use canes about 7 inches long; a part of the glass mass is left on the iron as waste, and accordingly it is not necessary that the canes extend to the very top of the mold. The diameter of these canes will depend on the length to which the bar is to be drawn and the width of the stripes desired. By way of example, I have used canes about one-quarter inch in diameter in making square bars measuring about one inch on each side.

The mold may be made of iron. With the canes standing in the mold, and the mold heated quite hot, I plunge the glass mass into the mold, working it with the iron as necessary to force the glass toward the corners of the mold and around the canes. Usually, I reheat the glass mass after the final rolling on the marver, to make it soft enough to assure its entry into the corners of the mold and surrounding the canes; it may be hot enough to tend to run slowly off the iron in large drops or gobs. When the glass has hardened sufficiently in the mold, I pull it out. The canes are now found attached to the mass, and the whole has the desired square cross-section (Fig. 4). Usually, I now re-heat the mass with the canes attached to assure adequate incorporation of the canes into the glass mass and to secure adequate softness for drawing. Then holding the iron 5, I grasp the smaller end of the mass with a tool and begin the drawing. This tool may be such as is illustrated at 6 in Fig. 5 for example, that is to say, a sort of spring clip with flat faces with which the opposite flat sides of the small end of the glass mass are grasped. Gradually then I separate the tools 5 and 6 to extend the glass and pull the mass of glass out into the form of a bar, reducing the cross-sectional areas of the body-mass and the canes, and as before pointed out the first stage of the drawing is done more or less horizontally, with more or less sag, as illustrated in Fig. 5. Frequently the glass is so soft at the start of the drawing as to tend to flow more or less, rather than to extend uniformly in the manner of an elastic body or tenacious plastics; to secure the proper movement and placing of the glass therefore, it may be necessary at this early stage to lift first one tool and then the other above its companion momentarily, and in general manipulate the tools and drawing glass in a manner that will be understood by those acquainted with glass drawing processes. As the glass approaches or reaches the condition in which it draws out more uniformly and like a tenacious material, and before the glass has cooled enough to permit the corners to break under this more nearly horizontal drawing, I discontinue the horizontal drawing and draw vertically to the finish, eliminating excessive bending of the bar, at least toward the end of this final operation. Thus, for example, I may hang the iron 5 on a pin 8 placed sufficiently high above the floor and draw downwardly with the tool 6; the iron 5 is crooked at one end for this purpose. Occasionally I find that I have to reverse the procedure, that is to say, hold the tool 6 above and pull down on the iron 5 in order to get the glass to draw as it should; usually, however, this condition is only temporary and in a moment or two I can reverse the arrangement again, hanging the iron 5 on the pin and drawing downwardly with the tool 6 in the manner shown in Fig. 6. Usually this temporary reversal of the drawing operation, when required, is required by some continued tendency of the glass to flow independently of the actual drawing, and hence the glass is still hot enough to permit reversal of the positions of the tools without breaking the corners, even though this reversal is accompanied by some bending of the drawing bar. During the drawing, and particularly the part of the drawing which is done vertically, the drawing bar can be fanned locally as necessary, to avoid thin spots, as customary in the drawing of round rods. By way of example, a fan is illustrated at 9.

After the glass mass has been drawn down to the proper dimensions and cooled sufficiently, it can be laid down on the floor and cut into suitable shorter lengths as heretofore done with round glass bars. The two enlargements 10 and 11 adjacent the tools is waste, usually saved however for re-melting.

It should be understood that my invention is not limited to applying canes of contrasting colors. Commonly there is a slight depression at each side of the cane in the finished bar, where the body part joins the cane, as is to be expected since the canes and mold tend to chill the surface of the initial cone of glass. Even if the canes are of the same color as the body glass therefore, the cane portions of the finished bar appear, or may be made to appear, rather prominently on the finished bar as bar-like projections from the surface of the bar, the surface of the bar being somewhat depressed at the two sides of each bar-like projection. For this and other reasons it may be desirable at times to apply cane of the same color as the body portion of the bar, and my invention can be used to do it. In general it will be understood that my invention is not limited to the details illustrated and described above except as appears hereinafter in the claims.

I claim:

1. As an article of manufacture, a polygonal glass bar having canes of contrasting color at edges thereof.

2. The method of making edged glass bars by drawing an appropriately shaped mass of glass to reduce the section thereof, which includes the steps of drawing the said pre-shaped mass in a more or less horizontal direction, turning the partly-formed bar into a substantially vertical position, and then continuing the drawing with the axis of the bar substantially vertical.

3. The method of making edged glass bars by drawing an appropriately shaped mass of glass to reduce the section thereof, which includes the steps of drawing the said pre-shaped mass in a more or less horizontal direction, lifting one end of the drawing mass higher than the other on occasion as necessary to counteract any tendency there may be for the glass to flow, then turning the partly-formed bar into a substantially vertical position, and then, continuing the drawing with the axis of the bar substantially vertical.

4. The method of making an edged glass bar having an external stripe along an edge, which includes the steps of attaching a glass cane to an edge of an appropriately shaped mass of glass, simultaneously drawing said cane and mass in a more or less horizontal direction, turning the axis of the partly-formed bar to a substantially vertical direction, and continuing the said simultaneous drawing with the axis of the bar substantially vertical, said drawing being performed throughout out of contact with shaping surfaces.

In testimony whereof, I have signed this specification.

JAMES GROSS.